(12) United States Patent
Pawar et al.

(10) Patent No.: US 8,539,191 B2
(45) Date of Patent: Sep. 17, 2013

(54) ESTIMATING SPACE IN A COMPRESSED VOLUME

(75) Inventors: Dnyaneshwar Pawar, Bangalore (IN); Rahul Khona, Santa Clara, CA (US); Subramanian Periyagaram, Bangalore (IN); Sandeep Yadav, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 759 days.

(21) Appl. No.: 12/349,423

(22) Filed: Jan. 6, 2009

(65) Prior Publication Data
US 2010/0174879 A1    Jul. 8, 2010

(51) Int. Cl.
*G06F 12/00* (2006.01)
(52) U.S. Cl.
USPC .............................. 711/170; 711/171; 711/172
(58) Field of Classification Search
USPC .......................................... 711/170, 171, 172
See application file for complete search history.

(56) References Cited

U.S. PATENT DOCUMENTS

| 7,200,603 | B1 * | 4/2007 | Hitz et al. | 1/1 |
| 2002/0083238 | A1 * | 6/2002 | Naka et al. | 710/68 |

OTHER PUBLICATIONS

U.S. Appl. No. 12/198,952, Voll et al.

\* cited by examiner

*Primary Examiner* — Midys Rojas
(74) *Attorney, Agent, or Firm* — Perkins Coie LLP

(57) ABSTRACT

A method and system for estimating space in a compressed volume to enable a storage server to respond to write requests before actually compressing and/or allocating data on disk. In some embodiments, in response to receiving a request to store data, the storage server estimates the amount of storage space required to store the data on disk. The storage server compares the estimated amount with the amount of available disk space. When the amount of available disk space is less than the estimated space, the storage server sends a response indicating that the request failed. Otherwise, when the amount of available disk space is greater than or equal to the estimate space, the storage server sends a response indicating that the request succeeded. The response is sent before the storage server allocates any disk space in connection with the request.

35 Claims, 11 Drawing Sheets

ESTIMATING SPACE IN A COMPRESSED VOLUME

FIELD OF THE INVENTION

At least one embodiment of the present invention pertains to storage systems, and more particularly, to compressing data in a storage server.

BACKGROUND

Various types of storage servers are used in modern computing systems. One type of storage server is a file server. A file server is a storage server which operates on behalf of one or more clients to store and manage files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a storage server is implemented in the form of an appliance that attaches to a network. NAS systems generally utilize file-based access protocols; therefore, each client may request the services of the storage system by issuing file system protocol messages to the file system over the network.

Another configuration in which storage servers can be used is a Storage Area Network (SAN). A SAN is a high-speed network that enables establishment of direct connections between a storage system and its storage devices. In a SAN configuration, clients' requests are specified in terms of blocks, rather than files. Conceptually, a SAN may be viewed as an extension to a storage bus that enables access to stored information using block-based access protocols over the "extended bus." In this context, the extended bus is typically embodied as Fiber Channel or Ethernet media adapted to operate with block access protocols. Thus, a SAN arrangement allows decoupling of storage from the storage system, such as an application server, and placing of that storage on a network.

Storage servers may also be utilized as secondary storage systems, such as the NearStore® line of products available from NetApp®, Inc. of Sunnyvale, Calif. Such secondary storage systems typically utilize magnetic disk drives in place of magnetic tape and/or optical media. A noted disadvantage of secondary storage systems is that the cost of magnetic disk drives is higher than that of tape and/or optical media. One technique to reduce the cost is to reduce the amount of data that is stored. This may be achieved, for example, by compressing the data prior to storing the data on disk, thereby reducing the total disk space required.

To date, storage systems have relied on compression techniques being applied at the application level (i.e., in the client) to reduce the amount of data that is stored. However, this approach requires special software to be built into the client applications. Other storage systems such as tape drives and disk controllers have used built-in hardware compression to achieve similar goals. However, incorporating a hardware based disk controller requires another layer of software to maintain a separate disk block mapping and is therefore undesirable for many reasons. For example, this technique binds a storage server to a single vendor for compression.

Other techniques involve data compression at the file system level by assembling together a group of logical data blocks and then compressing the group into lesser number of blocks, just before those blocks are stored to disk. However, these techniques assume that a predetermined data compression ratio is achieved, which does not necessarily hold true. For example, if the process employed assumes that every logical block overwrite in a group of physical blocks will take the entire compression group of physical blocks, then the process will overestimate the amount of space, and thereby lead to false failures based on an apparent lack of sufficient storage space. As another example, if the process employed assumes that every logical block overwrite in a group of physical blocks takes only one physical block, then when logical data blocks are flushed from memory to disk, there may not be enough space available, which may result in a data loss.

BRIEF DESCRIPTION OF THE DRAWINGS

One or more embodiments of the invention are illustrated by way of example and not limitation in the figures of the accompanying drawings, in which like references indicate similar elements and in which.

DETAILED DESCRIPTION

Figure 1:
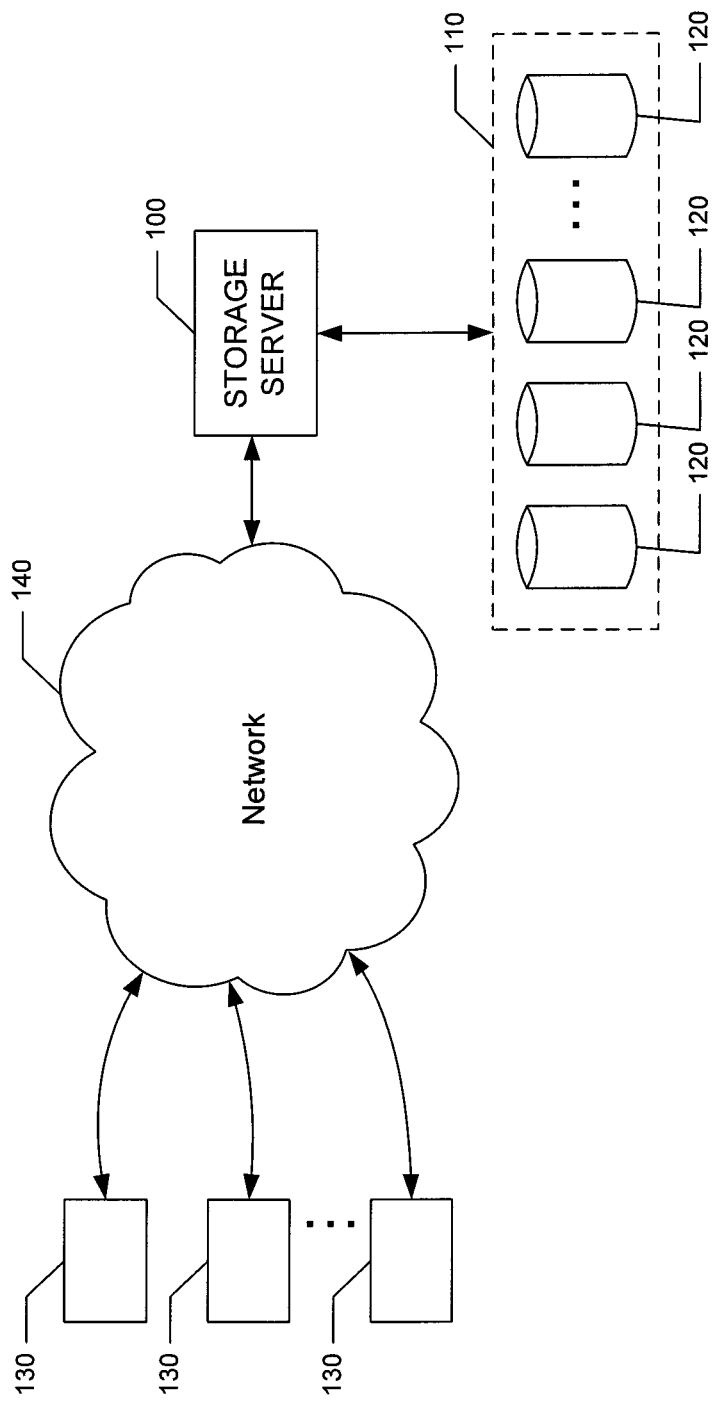
FIG. 1 is a data flow diagram of various components or services that are part of a storage network.

The technology introduced herein overcomes the disadvantages of the prior art by estimating space in a compression enabled storage system such that write requests may be responded to before compressing and/or allocating the write data in disk. Specifically, a technique to facilitate storage on a compression enabled volume is described. By employing the technology introduced herein, it is possible to estimate the storage space that will be consumed by write requests, thereby enabling a response to such requests before actually compressing and/or allocating the data on disk. Advantageously, by estimating the space consumed by data associated with a request and responding to the request without actually compressing and/or allocating the data on disk, the technology introduced herein reduces the response time without negatively impacting the accuracy of the response (e.g., returning false failures).

As used herein, the term "compression enabled" volume or device is used to describe a storage component that includes compression logic and/or decompression logic. As used herein, the term volume is used to describe a single accessible storage area associated with a file system, which is typically (though not necessarily) resident on a single partition of a hard disk. However, in some embodiments, the technology introduced herein is implemented across a plurality of compression enabled storage volumes of physical disks. Further, those skilled in the art will understand that one or more compression techniques may be utilized in accordance with the technology introduced herein—such as, for example, LZ (Lempel-Ziv) compression methods, LZW (Lempel-Ziv-Welch) compression methods, LZR (LZ-Renau) compression methods, etc.

The technology introduced herein may be implemented in accordance with a variety of storage architectures including, but not limited to, a NAS configuration, a SAN configuration, or a disk assembly directly attached to a client or host computer (referred to as a direct attached storage (DAS)), for example. The storage system may include one or more storage devices, and information stored on the storage devices may include structured, semi-structured, and unstructured data. The storage system includes a storage operating system that implements a storage manager, such as a file system, which provides a structuring of data and metadata that enables reading/writing of data on the storage devices. It is noted that the term "file system" as used herein does not imply that the data must be in the form of "files" per se. For example, in some embodiments, the data corresponds to a portion of a Logical Unit Number (LUN).

Each file maintained by the storage manager has an inode within an inode file, and each file is represented by one or more indirect blocks. The inode of a file is a metadata container that includes various items of metadata about that file, including the file size, ownership, last modified time/date, and the location of each indirect block of the file. Each indirect block includes a number of entries. Each entry in an indirect block contains a volume block number (VBN), and each entry can be located using a file block number (FBN) given in a client-initiated request (e.g., a read or write request). The FBNs are index values which represent sequentially all of the blocks that make up the data represented by a file. Each VBN is a pointer to the physical location at which the corresponding FBN is stored on disk.

In some embodiments, the storage system includes one or more "snapshots." A "snapshot" is a read-only, persistent point-in-time representation (e.g., image) of all of the data stored on one or more volumes (e.g., on disk or in other persistent memory), or a specified subset of such data. As described herein, when data to be overwritten or extended is included in one or more snapshots stored by the storage system, the estimated space associated with overwriting or extending the data is greater than the estimated space if a snapshot were not included. This is because the data blocks are essentially "locked" in the snapshot (because it is read-only), such that overwriting or extending the data does not result in deallocation of the original data blocks.

In some embodiments, the storage system implements one or more compression/decompression algorithms. Details regarding compression/decompression algorithms are known and well documented, and thus need not be described in detail in order to gain an understanding of the concepts and operation of the technology introduced herein. As introduced herein, the storage system responds to write requests (e.g., hole fill, data modification, data extension, etc.) before actually compressing and allocating data on disk. To accomplish this, the storage manager implements a technique to estimate space on a compression enabled volume such that the data associated with requests is not lost (e.g., when the data is flushed to disk) or improperly rejected.

In some embodiments, to facilitate the delayed allocation of storage space associated with write requests, the storage manager maintains an amount of free storage space (referred to as "free blocks" or "FB") and an amount of reserved storage space (referred to as "reserve blocks" or "RB"). As used herein, free blocks represent a number of blocks on disk that are available for data storage. As used herein, reserved blocks represent a number of blocks that are unavailable for data storage, but have not actually been allocated on disk. Instead, the data associated with the reserved blocks is stored in memory (such as, e.g., a buffer or cache of the storage server) until it is flushed to disk. For example, this may occur during an event called a "consistency point", in which the storage server stores new or modified data to its mass storage devices based on buffered write requests.

The technology introduced herein includes a compression grouping component and a reservation component. The compression grouping component determines whether the number of blocks associated with a write request is greater than or equal to a maximum compression group size. As used herein, a compression group is metadata that represents a number of logically adjacent blocks of data, and each entry in a compression group points to a different block.

To facilitate description, it is assumed that the storage system operates on 4 kbytes sized blocks of data, and each FBN/VBN pair corresponds to a different 4 kbyte block. To further facilitate description, it is assumed that every eight consecutive VBNs in each indirect block are defined as representing a compression group. Thus, each compression group represents 32 kbytes (8×4 kbytes) of uncompressed data in the current example. Note that in other embodiments, a compression group can be defined as a different number of consecutive VBNs of an indirect block, or as a predetermined number of pointers in an inode, or in some other manner. There is a trade-off in how big compression groups should be and where they can start. If compression groups are large (e.g., 128 kbytes), then a large amount of CPU processing, additional I/O and possibly memory is required to retrieve a single block of data. For workloads that read whole files sequentially, this is not an overriding concern, since this work needs to be done anyway. However, for workloads that randomly read selected chunks of a file, the result may very well be decompressing large chunks of a file just to retrieve a small section of data. This involves more I/O, since it is necessary to read all of the compressed data blocks of a whole compression group. Typically, it is desirable to avoid as much extra I/O as possible when decompressing data. Note also that in certain embodiments, the size of compression groups can be varied dynamically.

As described herein, the compression grouping component determines whether the number of blocks associated with a write request is greater than or equal to a maximum compression group size. When the number of blocks is greater than or equal to the maximum compression group size, the compression grouping component defines one or more "compression groups" corresponding to the data blocks associated with the write request. When the number of blocks is less than the maximum compression group size, the compression grouping component defines a single compression group corresponding to the blocks associated with the write request.

As described herein, the reservation component estimates the space which will be consumed in response to servicing a write request (i.e., storing the data blocks of each compression group). In some embodiments, the reservation component may determine that the estimated space is less than the size of the compressed data. That is, the reservation component may determine that the space to be consumed is a negative amount. For example, the reservation component may determine that, when a write request (e.g., modifying uncompressed data on disk) is actually committed to disk, the resulting deallocation of memory (e.g., the number of block added to the free block count) will be greater than the estimated delayed allocation of memory (e.g., the number of reserved blocks).

In some embodiments, when estimating space, the reservation component uses a predefined threshold. Such a threshold may indicate, for example, a particular reduction in the amount of storage space consumed which must be achieved to merit the use of compression. For example, when 8 kbytes of data corresponding to two consecutive VBNs representing a compression group can only be compressed down to 5 kbytes of data, the reservation component may determine it is not valuable to compress the data because two 4 kbyte data blocks would still be consumed to hold all of the compressed data (i.e., no disk space would be saved). In such cases, the reservation component would estimate the space to be equal to the number of blocks storing the uncompressed data. It is noted that any number of predefined thresholds may be employed.

As described herein, when the number of free blocks is greater than or equal to the number of reserved blocks for a particular request, the storage system sends a response to the requester indicating that the write request has succeeded. Otherwise, when the number of free blocks is less than the number of reserved blocks, the storage manager sends a response to the requester indicating that the write request has failed. In each case, the response that indicates whether the request succeeded or failed is sent without compressing and/or allocating the data blocks on disk.

At some later point, when the data is written to persistent storage of the storage system, the storage manager compresses the data using one of a variety of compression techniques. For example, this may occur during an event called a "consistency point", in which the storage server stores new or modified data to its mass storage devices from its buffer cache. A technique for file system level compression, which is suitable for this purpose, is described in commonly-owned, co-pending U.S. patent application Ser. No. 12/198,952 of J. Voll et al., filed on Aug. 27, 2008 and entitled, "SYSTEM AND METHOD FOR FILE SYSTEM LEVEL COMPRESSION USING COMPRESSION GROUP DESCRIPTORS", which is incorporated herein by reference.

By employing the technology introduced herein, it is possible to estimate the storage space that will be consumed by write requests, thereby enabling a response to such requests before actually compressing and/or allocating the data on disk. Advantageously, by estimating the space consumed by data associated with a request and responding to the request without actually compressing and/or allocating the data on disk, the technology introduced herein reduces the response time without negatively impacting the accuracy of the response (e.g., returning false failures).

Before considering the technology introduced herein in greater detail, it is useful to consider an environment in which the technology can be implemented. FIG. 1 is a data flow diagram that illustrates various components or services that are part of a storage network. A storage server 100 is connected to a storage subsystem 110 which includes multiple mass storage devices 120, and to a number of clients 130 through a network 140, such as the Internet or a local area network (LAN). The storage server 100 may be a file server used in a NAS mode, a block-based server (such as used in a storage area network (SAN)), or a server that can operate in either mode.

The clients 130 may be, for example, a personal computer (PC), workstation, server, etc. The clients 130 may interact with the storage server 100 in accordance with a client/server model of information delivery. That is, a client 130 may request the services of the storage server 100, and the server may return the results of the services requested by the client 130, by exchanging packets of information over the network 140. The client 130 may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Importantly, the client 130 does not need to be modified to utilize a compression technique.

The storage subsystem 110 is managed by the storage server 100. The storage server 100 receives and responds to various transaction requests (e.g., read, write, etc.) from the clients 130 directed to data stored or to be stored in the storage subsystem 110. The mass storage devices 120 in the storage subsystem 110 may be, for example, magnetic disks, optical disks such as CD-ROM or DVD based storage, magneto-optical (MO) storage, or any other type of non-volatile storage devices suitable for storing large quantities of data. Storage of information on the storage devices 120 may be implemented as one or more storage volumes that comprise a collection of physical storage disks cooperating to define an overall logical arrangement of volume block number (VBN) space on the volumes. Each logical volume is generally, although not necessarily, associated with a single file system. The disks within a volume are typically organized as one or more groups, and each group can be organized as a Redundant Array of Inexpensive Disks (RAID), in which case the storage server 100 accesses the storage subsystem 110 using one or more well-known RAID protocols. However, other implementations and/or protocols may be used to organize the storage devices 120 of storage subsystem 110.

In some embodiments, the technology introduced herein is implemented in the storage server 100, or in other devices. For example, the technology can be adapted for use in other types of storage systems that provide clients with access to stored data or processing systems other than storage servers. While various embodiments are described in terms of the environment described above, those skilled in the art will appreciate that the technology may be implemented in a variety of other environments including a single, monolithic computer system, as well as various other combinations of computer systems or similar devices connected in various ways. For example, in some embodiments, the storage server 100 has a distributed architecture, even though it is not illustrated as such in FIG. 1.

Figure 2:
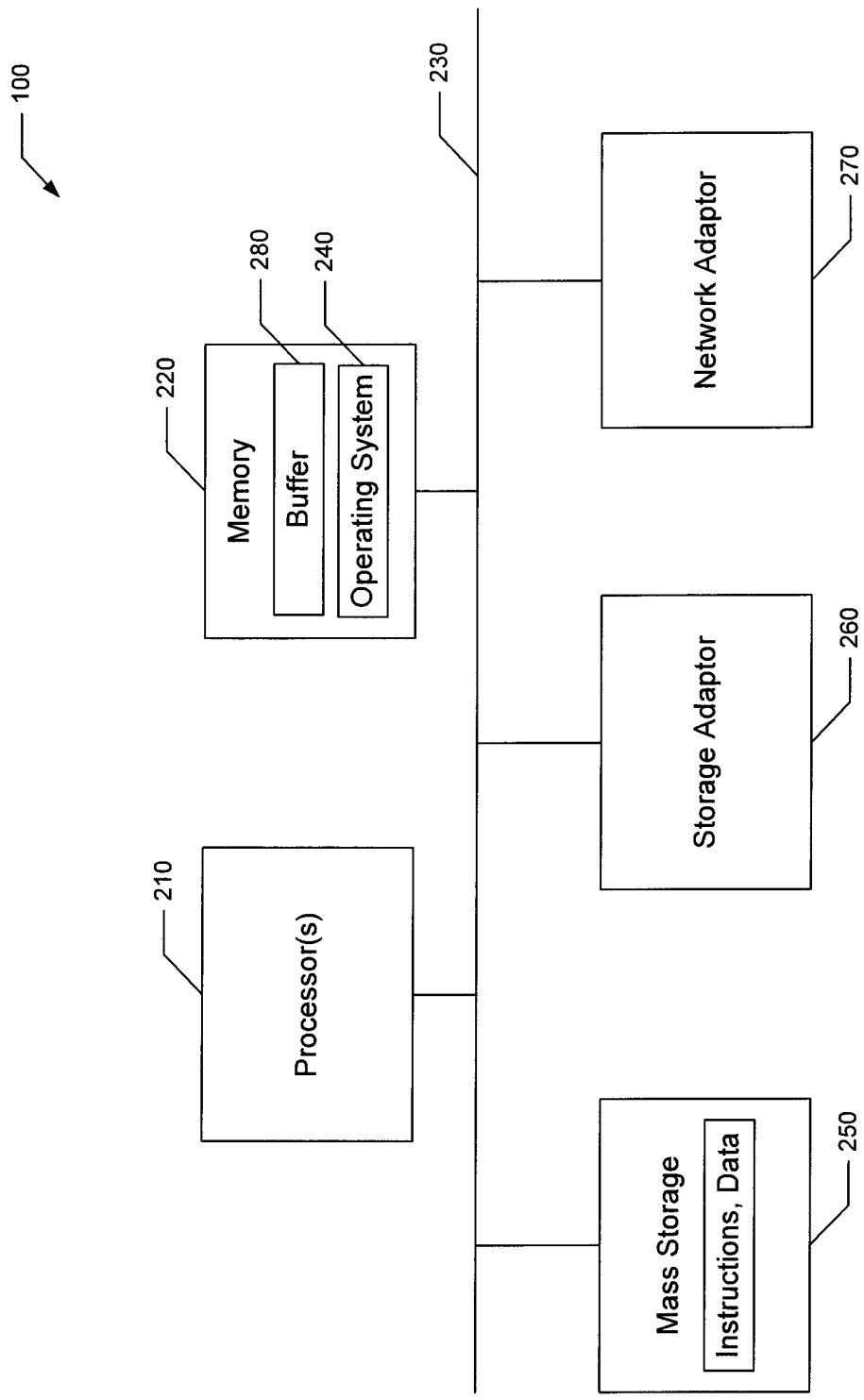
FIG. 2 is a high-level block diagram of a storage server.

FIG. 2 is a high-level block diagram showing an example architecture of the storage server 100. Certain well-known structures and functions have not been shown or described in detail to avoid obscuring the description. The storage server 100 includes one or more processors 210 and memory 220 coupled to an interconnect system 230. The interconnect system 230 shown in FIG. 2 is an abstraction that represents any one or more separate physical buses and/or point-to-point connections, connected by appropriate bridges, adapters and/or controllers. The interconnect system 230, therefore, may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 210 are the central processing units (CPUs) of the storage server 100 and, thus, control its overall operation. In some embodiments, the processors 210 accomplish this by executing software stored in memory 220. A processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 includes the main memory of the storage server 100. Memory 220 represents any form of random access memory (RAM), read-only memory (ROM), flash memory, or the like, or a combination of such devices. Memory 220 stores (among other things) the storage server's operating system 240. A portion of the memory 220 may further include a buffer 280 for storing data associated with received requests. For example, the buffer 280 may include one or more compression/decompression buffers (not shown).

Also connected to the processors 210 through the interconnect system 230 are one or more internal mass storage devices 250, a storage adapter 260 and a network adapter 270. Internal mass storage devices 250 may be or include any conventional medium for storing large volumes of data in a non-volatile manner, such as one or more magnetic or optical based disks. The storage adapter 260 allows the storage server 100 to access the storage subsystem 110 and may be, for example, a Fibre Channel adapter or a SCSI adapter. The network adapter 270 provides the storage server 100 with the ability to communicate with remote devices, such as the clients 130, over a network and may be, for example, an Ethernet adapter, a Fibre Channel adapter, or the like.

Figure 3:
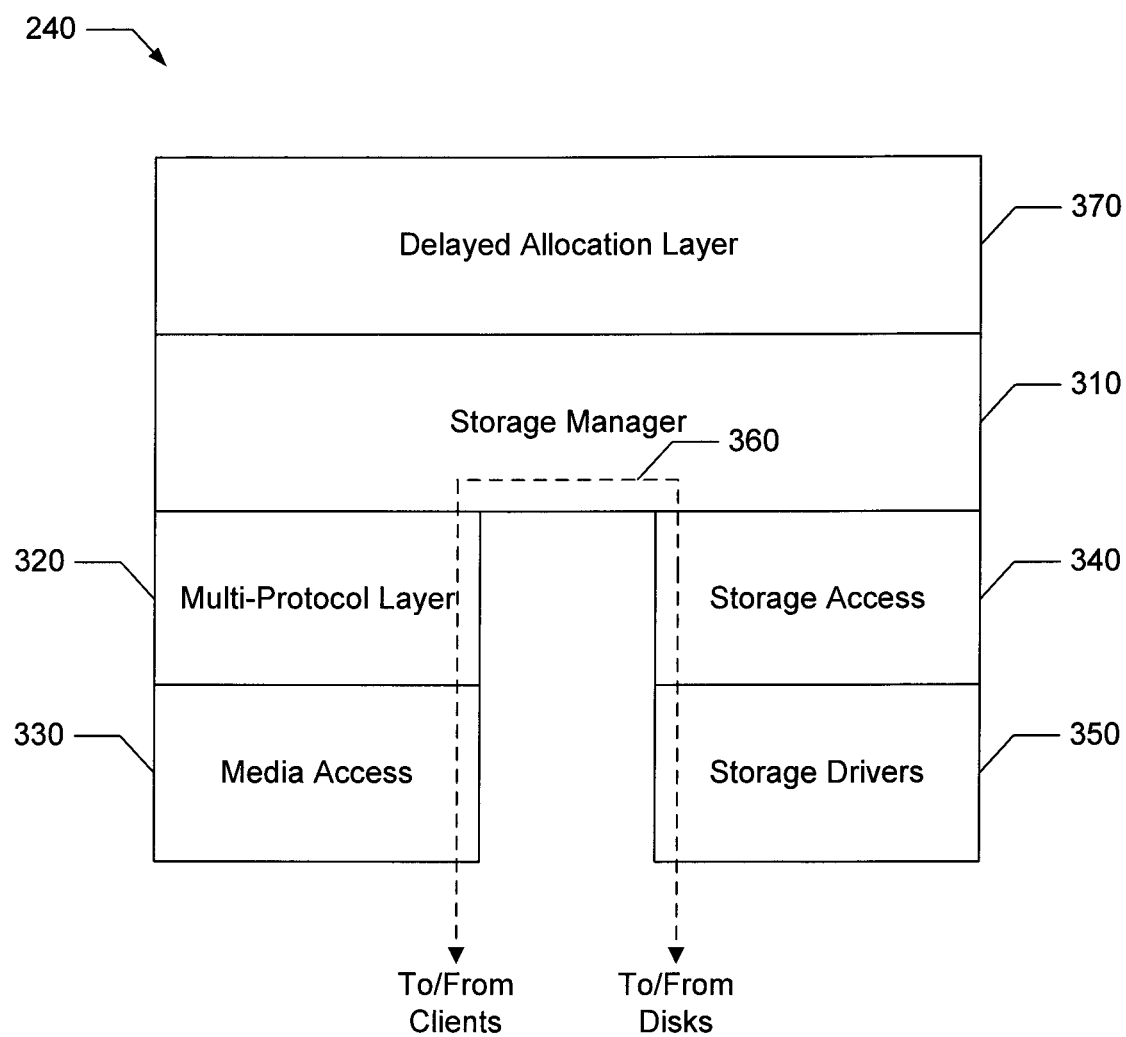
FIG. 3 is a high-level block diagram showing an example of an operating system of a storage server.

FIG. 3 shows an example of the architecture of the operating system 240 of the storage server 100. As shown, the operating system 240 includes several software modules, or "layers." These layers include a storage manager 310. The storage manager 310 is application-layer software that imposes a structure (hierarchy) on the data stored in the storage subsystem 110 and services transaction requests from clients 130. In some embodiments, storage manager 310 implements a write in-place file system algorithm, while in other embodiments the storage manager 310 implements a write-anywhere file system. In a write in-place file system, the locations of the data structures, such as inodes and data blocks, on disk are typically fixed and changes to such data structures are made "in-place." In a write-anywhere file system, when a block of data is modified, the data block is stored (written) to a new location on disk to optimize write performance (sometimes referred to as "copy-on-write"). A particular example of a write-anywhere file system is the Write Anywhere File Layout (WAFL®) file system which is part of the Data ONTAP® storage operating system available from NetApp, Inc. of Sunnyvale, Calif. The WAFL® file system is implemented within a microkernel as part of the overall protocol stack of a storage server and associated storage devices, such as disks. This microkernel is supplied as part of NetApp's Data ONTAP® storage operating system software. It is noted that the technology introduced herein does not depend on the file system algorithm implemented by the storage manager 310.

Logically "under" the storage manager 310, the operating system 240 also includes a multi-protocol layer 320 and an associated media access layer 330, to allow the storage server 100 to communicate over the network 140 (e.g., with clients 130). The multi-protocol layer 320 implements various higher-level network protocols, such as Network File System (NFS), Common Internet File System (CIFS), Hypertext Transfer Protocol (HTTP) and/or Transmission Control Protocol/Internet Protocol (TCP/IP). The media access layer 330 includes one or more drivers which implement one or more lower-level protocols to communicate over the network, such as Ethernet, Fibre Channel or Internet small computer system interface (iSCSI).

Also logically under the storage manager 310, the operating system 240 includes a storage access layer 340 and an associated storage driver layer 350, to allow the storage server 100 to communicate with the storage subsystem 110. The storage access layer 340 implements a higher-level disk storage protocol, such as RAID, while the storage driver layer 350 implements a lower-level storage device access protocol, such as Fibre Channel Protocol (FCP) or small computer system interface (SCSI). Also shown in FIG. 3 is a path 360 of data flow, through the operating system 240, associated with a request.

In one embodiment, the operating system 240 also includes a delayed allocation layer 370 logically on top of the storage manager 310. The delayed allocation layer 370 is an application layer that estimates space in a compression enabled volume to service write requests (e.g., hole fill, data modification, data extension, etc.) received by the storage manager 310. In operation, the delayed allocation layer 370 enables the storage manager 310 to respond to a write request before compressing and/or allocating data on disk in relation to the request. In yet another embodiment, the delayed allocation layer 370 is included in the storage manager 310. Note, however, that the delayed allocation layer 370 does not have to be implemented by the storage server 100. For example, in some embodiments, the delayed allocation layer 370 is implemented in a separate system to which storage requests are provided as input.

Figure 4:
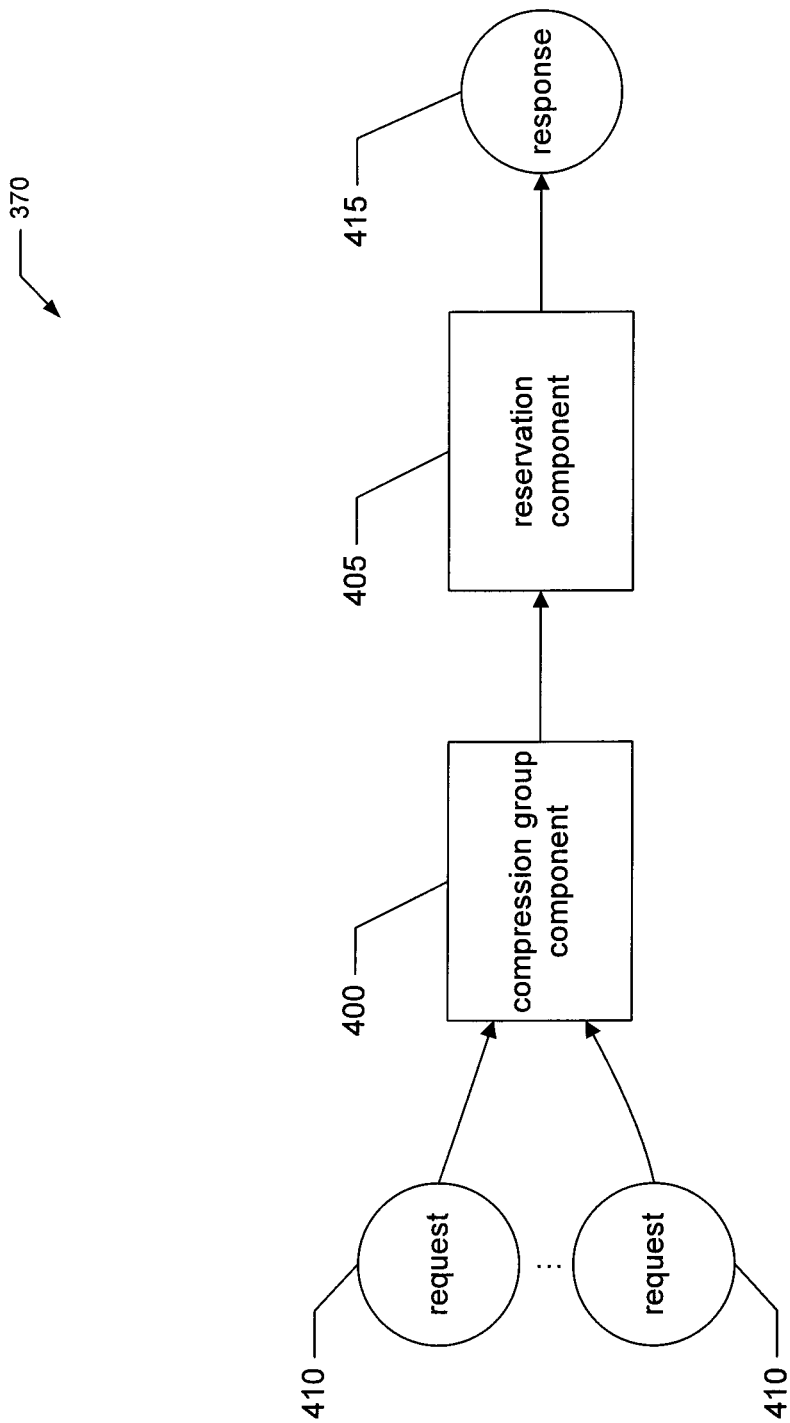
FIG. 4 illustrates the relevant functional elements of a delayed allocation layer, according to some embodiments.

FIG. 4 illustrates the relevant functional elements of the delayed allocation layer 370 of the operating system 240, according to one embodiment. The delayed allocation layer 370 (shown in FIG. 4) includes a compression grouping component 400 and a reservation component 405. The compression grouping component 400 receives requests 410 (e.g., a write request) to read/write data on the storage devices 120 of the storage subsystem 110. As described herein, the compression grouping component 400 processes each request 410 to define one or more compression groups corresponding to the data associated with a request 410. In some embodiments, the compression grouping component 400 accomplishes this by comparing the number of data blocks associated with a request 410 to a maximum compression group size. When the number of blocks is greater than or equal to the maximum compression group size, the compression grouping component 400 defines one or more compression groups corresponding to the data blocks associated with the request 410. When the number of blocks is less than the maximum compression group size, the compression grouping component defines one compression group corresponding to the data blocks associated with the request 410.

As used herein, a compression group is metadata that represents a number of logically adjacent blocks of data (i.e., sequential FBNs), and each entry in a compression group points to a different block. To facilitate description, it is assumed that every eight consecutive VBNs in each indirect block are defined as representing a compression group. Note that in other embodiments, however, a compression group can be defined as a different number of consecutive VBNs of an indirect block, or as a predetermined number of pointers in an inode, or in some other manner.

Based on the one or more defined compression groups, the reservation component 405 estimates an amount of space (e.g., the number of estimated blocks) that may be consumed by storing data associated with a request 410. In some embodiments, the reservation component 405 determines whether the data, when compressed, satisfies a threshold level of savings. The reservation component 405 may use a predefined threshold that indicates, for example, a particular reduction in the amount of storage space consumed which must be achieved to merit the use of compression. In cases where the threshold is not satisfied, the reservation component 405 estimates the consumed space based on the size of the uncompressed data. Otherwise, the estimation is based on the size of the compressed data.

The reservation component 405 then generates a response 415 indicating whether such space is available. In some embodiments, a response 415 is generated for each compression group associated with a request 410, while in other embodiments a single response 415 is generated for each request 410. For example, when the available space (e.g., number of free blocks) is greater than or equal to the reserved space (e.g., number of reserved blocks) plus the estimated space (e.g., number of estimated blocks), the reservation component 405 generates a response indicating that space is available. However, when the available space is less than the reserved space plus the estimated space, the reservation component 405 generates a response indicating that space is unavailable. It is noted that, if space is unavailable for even a single compression group associated with a request 410, the request will ultimately fail. Importantly, the reservation component 405 estimates the consumed space without compressing and/or allocating the data blocks on disk. This may be accomplished, for example, by reserving a number of blocks based on the estimated space required to service the request 410.

In some embodiments, the compression grouping component 400 and the reservation component 405 are embodied as software modules within the delayed allocation layer 370 of the operating system 240. In other embodiments, however, the functionality provided by these components can be implemented, at least in part, by one or more dedicated hardware circuits. The compression grouping component 400 and the reservation component 405 may be stored or distributed on, for example, computer-readable media, including magnetically or optically readable computer discs, hard-wired or preprogrammed chips (e.g., EEPROM semiconductor chips), nanotechnology memory, or other computer-readable storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave(s), etc.) over a period of time, or they may be provided on any analog or digital network (packet switched, circuit switched, or other scheme).

Figure 5A:
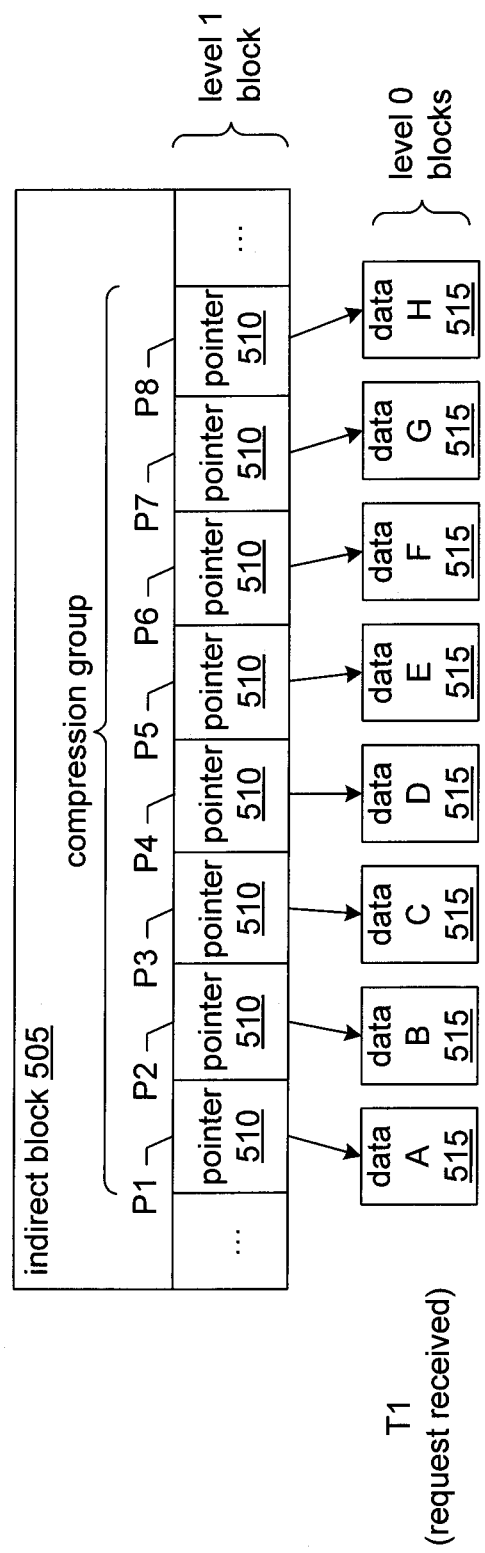
FIGS. 5A and 5B illustrate an example structure of a compression group before and after compression.
Figure 5B:
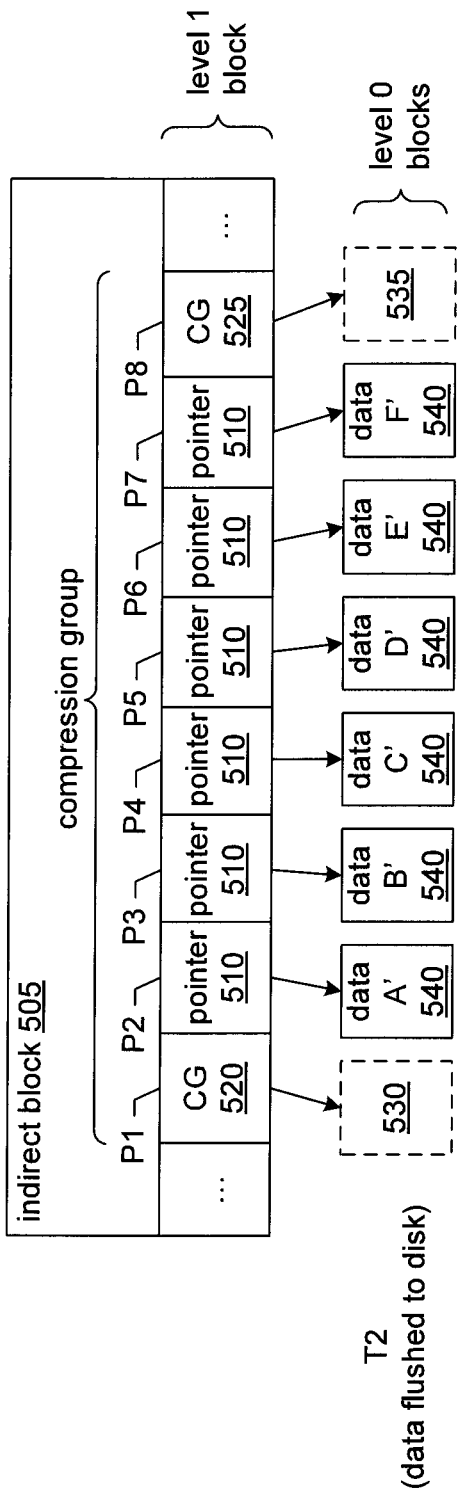

FIGS. 5A and 5B illustrate an example structure of a compression group before and after compression, respectively, using a compression group size of eight blocks. For example, in FIG. 5A, at time T1, the storage server 100 may receive a request to modify data stored in uncompressed data blocks 515. Initially, the modified data is stored in the storage server's buffer cache (RAM). As illustrated in FIG. 5B, at some later time T2, such as during an event known as a consistency point, the storage server 100 stores the modified data to the storage subsystem 110. Importantly, the storage server 100 responds to the request before time T2, and without compressing and allocating the data on disk. Note that a request (e.g., hole file, modify data, extend data, read, etc.) may be associated with a greater number of data blocks than that shown in FIG. 5A.

In particular, FIG. 5A illustrates a level-1 indirect block 505 that includes a number of pointers 510, e.g., P1-P8. Each file maintained by the storage manager 310 has an inode within an inode file, and each file is represented by one or more indirect blocks. It is noted that there may be additional levels of indirect blocks 505 (e.g., level-2, level-3, etc.) depending upon the size of the file. The inode of a file is a metadata container that includes various items of metadata about that file, including the file size, ownership, last modified time/date, and the location of each indirect block of the file. Each indirect block 505 includes a number of entries. Each entry in an indirect block 505 contains a volume block number (VBN) pointer 510, and each entry can be located using a file block number (FBN) given in a client-initiated request (e.g., a read or write request). The FBNs are index values which represent sequentially all of the data blocks 515 that make up the data represented by a file. Each pointer 510 points to (references) a level-0 data block 515 that is stored at a particular VBN of a storage device 120.

As illustrated, the eight pointers 510 (P1-P8) are arranged into a compression group representing eight level-0 data blocks 515 (data A-H). As used herein, a compression group represents a number of logically adjacent blocks of data (i.e., sequential FBNs), and each entry in a compression group points to a different block. To facilitate description, it is assumed that every eight consecutive VBNs in each indirect block are defined as representing a compression group. Note, however, the size of compression groups may vary. As such, the description of an eight block compression group should not be taken as restrictive.

Each level-1 indirect block may comprise a number of compression groups. For example, in a 4 kbyte indirect block, if each pointer is 32 bits, then 1024 pointers can be stored within the block. As illustrated in FIGS. 5A and 5B, eight pointers 510 are included per compression group, therefore, 128 compression groups are stored per level 1 indirect block 505. However, it should be noted that in alternative embodiments, the number of compression groups, pointers per indirect block, size of indirect blocks and/or size of pointers may vary. As such, the description of 128 compression groups per level 1 indirect block should not be taken as restrictive.

Further, it should be noted that while the technology introduced herein is described in terms of compression groups comprising level 1 indirect block pointers referencing adjacent level 0 data blocks, the technology may be utilized in alternative hierarchies. Thus, for example, the technology may be implemented with a level 2 indirect block referencing a plurality of level 1 indirect blocks, etc. As such the description of compression groups consisting of level 1 indirect blocks referencing level 0 data blocks should not be taken as restrictive.

FIG. 5B illustrates an example structure of a compression group after compression at time T2. As shown, the eight level 0 data blocks 515 have been compressed into six level 0 compressed data blocks 540 (compressed data A'-F'). The compression group includes a compression group descriptor ("header") 520 that signifies that the data for the adjacent level 0 blocks is compressed into a lesser number of physical data blocks. In some embodiments, one or more compression group descriptors ("footers") 525 are included in the compression group. For example, if the eight blocks 515 of the compression group illustrated in FIG. 5A were compressed to a total of four physical blocks 540, the compression group would then comprise a compression descriptor header 520, four pointers 510 that reference the compressed data, and three compression descriptor footers 525. It is further noted that the illustration of an eight block compression group being compressed to six physical blocks should not be taken as restrictive.

The descriptors 520 and 525 are valid pointers that reference physical blocks 530 and 535, respectively. In some embodiments, descriptors 520 and 525 are equal, and each therefore references the same physical block. However, in other embodiments the descriptors 520 and 525 differ, and therefore reference different physical blocks. In some embodiments, the storage server 100 reserves a number of physical block addresses that may be utilized to identify a particular type of compression to be utilized for the compression group and/or other metadata related to a compression group. For example, a particular compression descriptor 520 may identify a particular physical block (e.g., block 530) that is associated with a particular compression algorithm. Thus, for example, the block 530 may be referenced by all compression groups utilizing the particular compression algorithm.

Figure 6:
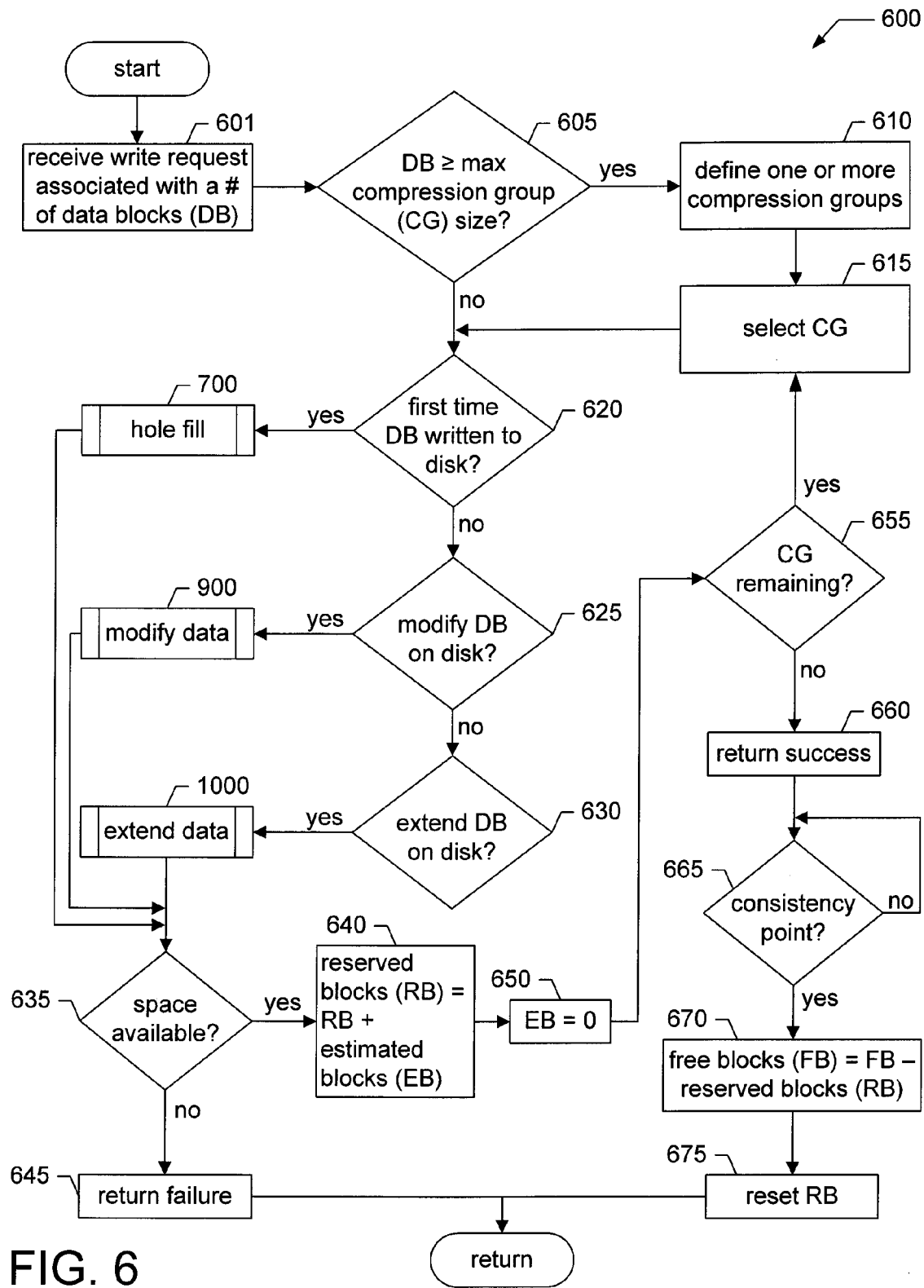
FIG. 6 is a flow chart of a process for responding to write requests without compressing and allocating the data on disk.

Importantly, the storage server 100 responds to the received request before time T2, and without compressing and/or allocating space for the data on disk. FIG. 6 is a flow chart of a process 600 for responding to write requests without compressing and allocating space for the data on disk. In some embodiments, the process 600 may be implemented by the storage manager 310 and the delayed allocation layer 370 to respond to write requests received from clients 130.

Initially, at step 601, the process receives a write request 410 associated with a number of data blocks, such as a file. For example, storage manager 310 may receive a modify data request 410 associated with data blocks 515. Requests may include data blocks, modifications to data blocks, a reference to data blocks, etc. However, to facilitate description, it is assumed that the received request 410 includes the data (e.g., blocks) that is to be written to disk. After receiving the request 410, the write data associated with the request is stored in a buffer cache (RAM) of the storage server 100.

Next, at step 605, the process determines whether the number of data blocks associated with the received request is greater than or equal to a maximum compression group size. To facilitate description, it is assumed that the maximum compression group size is eight. In the current example, the number of data blocks 515 is equal to the maximum compression group size. Note, however, the size of compression groups may vary. As such, the description of an eight block compression group should not be taken as restrictive.

If the number of data blocks is greater than or equal to the maximum compression group size, the process proceeds to step 610 where one or more compression groups are defined. As used herein, a compression group is metadata that represents a number of logically adjacent blocks of data, and each entry in a compression group points to a different block. Thus, if a request associated with twelve blocks of data were received, two compression groups would be defined, assuming a maximum compression group size of eight is used (i.e., one compression group representing eight data blocks and the other compression group representing the remaining four blocks of data).

After defining one or more compression groups at step 610, the process proceeds to step 615. At step 615, the process selects one of the defined compression groups. Then the process proceeds to step 620 as described below. However, if at step 605 the number of data blocks is less the maximum compression group size, the process proceeds to step 620.

At step 620, the process determines whether the request 410 is associated with data already stored on disk. If the request 410 is associated with data already stored on disk, the process continues at step 625 as described below. Otherwise, if the data has not previously been stored on disk, the process continues by calling a hole fill process 700 to estimate the space consumed should the data be written to disk for the first time. When data blocks are deallocated, the one or more empty blocks are referred to as a "hole." A hole may be defined as a logical portion of disk for which there is no assigned physical storage. New data blocks may be allocated to fill such holes. The hole fill process 700 is discussed below in connection with FIG. 7. Then the process continues at step 635 as described below.

At step 625, the process determines whether the request 410 is to modify data stored on disk. If the request 410 is not to modify data on disk, the process continues at step 630 as described below. Otherwise, if the request 410 is to modify data on disk, the process continues by calling a modify data process 900 to estimate the space that will be consumed should the data be modified. The modify data process 900 is discussed below in connection with FIG. 9. Then the process continues at step 635 as described below.

At step 630, the process determines whether the request 410 is to extend data stored on disk. If the request 410 is to extend data on disk, the process continues by calling an extend data process 1000 to estimate the space that will be consumed should the data be extended. The extend data process 1000 is discussed below in connection with FIG. 10. It is noted that the technology introduced herein can also be implemented to process other types of write requests not mentioned here. Thus, the particular write requests (i.e., hole fill, modify data, and extend data) discussed in connection with FIGS. 6-10 should not be taken as restrictive.

At step 635, based on the result returned from the estimation process (e.g., process 700, 900, 1000), the process determines whether space is available to service the request 410. If space is available, the process continues at step 640 as described below. Otherwise, if space is unavailable, then the process proceeds to step 645 where a response 415 is sent to the requester indicating that the request 410 failed. Also at step 645, any reserved blocks associated with the request 410 (e.g., blocks reserved in connection with a different compression group) are removed from the reserved block count.

At step 640, the process increases the number of reserved blocks by the number of estimated blocks. Next, the process proceeds to step 650 where the number of estimated block is set to zero. Then the process proceeds to step 655.

At step 655, the process determines whether there is any remaining compression group associated with the request 410. If any compression group has not been processed, the process continues at step 615 to select a next compression group, as described above. Otherwise, if no compression group remains, the process proceeds to step 660 where a response is sent to the requester indicating that the request succeeded. Then the process proceeds to step 665.

At step 665, the process determines whether the data associated with the request 410 has been written to disk. This may occur, for example, during an event called a "consistency point", in which the storage server 100 stores new or modified data blocks in buffer cache to the storage subsystem 110 based on the buffered write requests. If a consistency point has occurred, the process proceeds to step 670, otherwise the process continues processing at step 665.

At block 670, the process updates the number of available free blocks based on the number of reserved blocks that were written to disk as a result of the consistency point. That is, the number of free blocks is reduced by the number of reserved blocks corresponding to data that is now stored on disk. Next, the process continues to block 675. At block 675, the number of reserved block is reduced to account for the number of reserved blocks that were written to disk. Then the process ends.

Those skilled in the art will appreciate that the steps/operations shown in FIG. 6 and in each of the following flow diagrams may be altered in a variety of ways. For example, the order of certain steps may be rearranged; certain substeps may be performed in parallel; certain shown steps may be omitted; or other steps may be included; etc.

Figure 7:
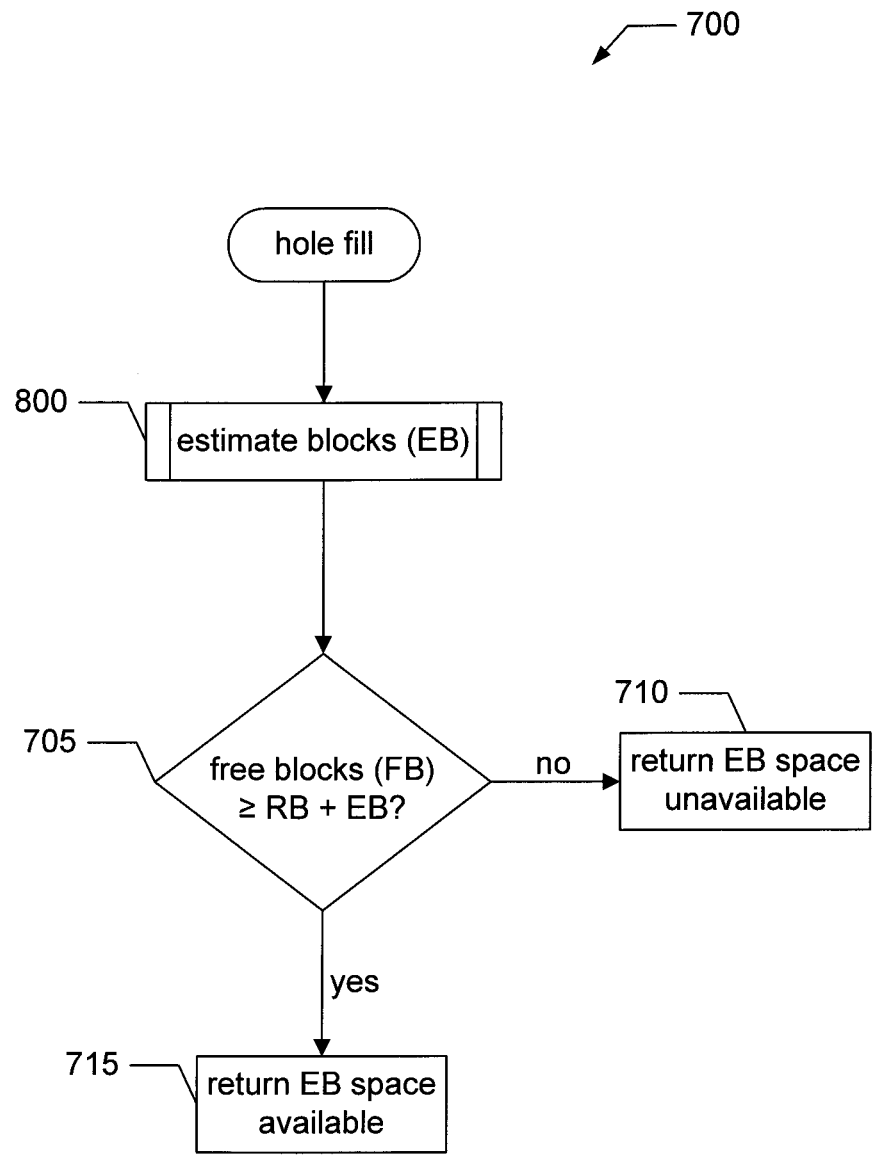
FIG. 7 is a flow chart of process for estimating space in a compression enabled volume in response to a request to write data that has not previously been stored.

FIG. 7 is a flow chart of process 700 for estimating space in a compression enabled volume in response to a request 410 to store data that has not previously been stored thereon. As described herein, this process may be invoked, for example, by process 600. In some embodiments, the process 700 is implemented by the reservation component 405.

Initially, the process 700 calls an estimate blocks process 800 to estimate the space required to store the data. The estimate blocks process 800 is discussed below in connection with FIG. 8. At step 705, the process determines whether the number of free blocks (FB) is greater than or equal to the combined number of estimated blocks (EB) and reserved blocks (RB). If the number of free blocks is less than the combined number of estimated blocks and reserved blocks, then the process proceeds to step 710 where a message is returned to the calling process (e.g., process 600) indicating that the storage space is unavailable. Then the process ends.

Otherwise, if the number of free blocks is greater than or equal to the combined number of estimated blocks and reserved blocks, then the process proceeds to step 715 where a message is returned to the calling process (e.g., process 600) indicating that the storage space is available. Then the process ends.

Figure 8:
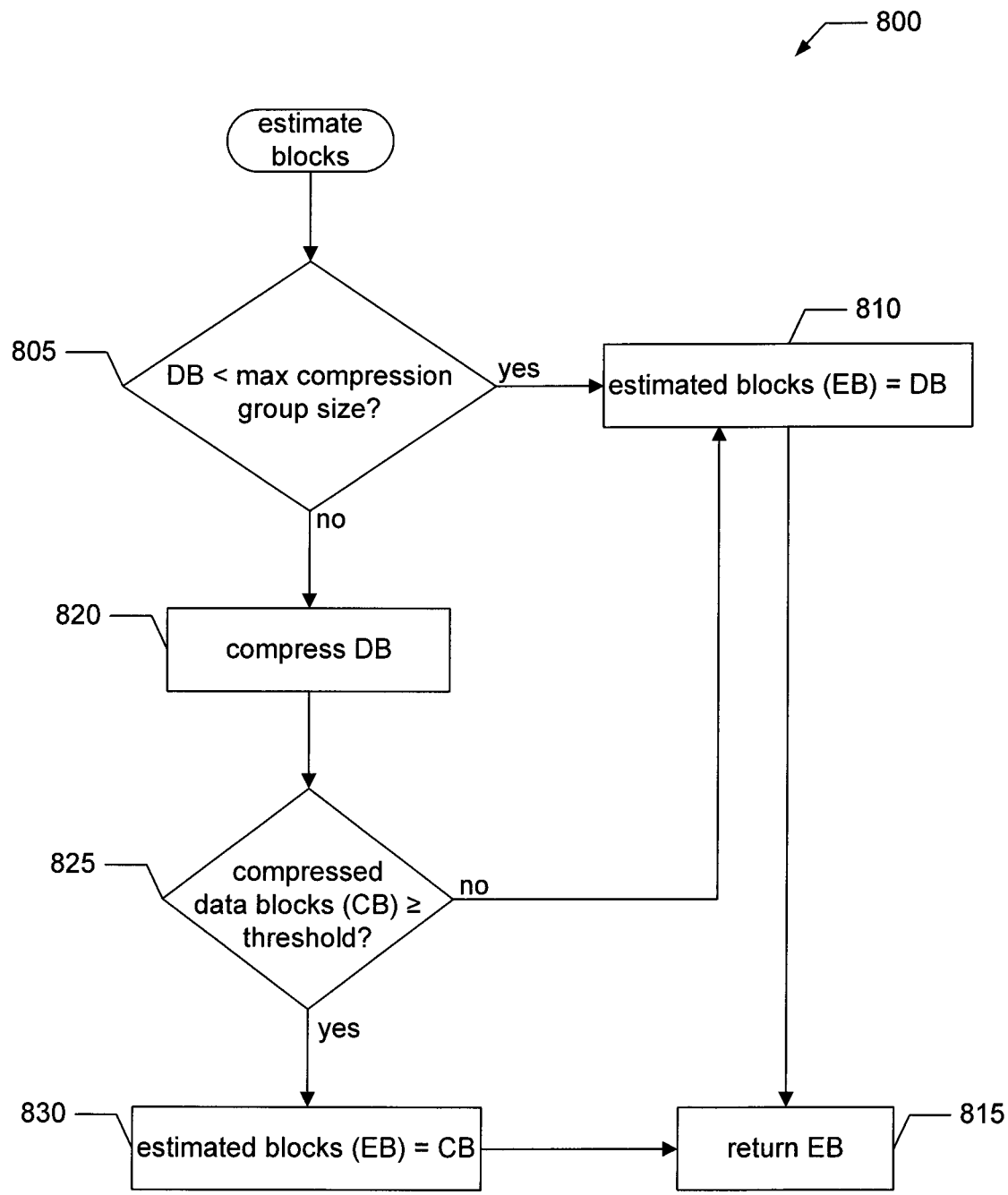
FIG. 8 is a flow chart of a process for estimating space to store data in a compression enabled volume.

FIG. 8 is a flow chart of a process for estimating space to store data in a compression enabled volume. As described herein, this process may be invoked for example, by processes 700, 900, and 1000. In some embodiments, the process 800 is implemented by the reservation component 405.

Initially, at step 805, the process determines whether the number of data blocks associated with the request 410 is less than the maximum compression group size. For example, referring to FIG. 5A, the process 800 may determine that the number of data blocks (not shown) associated with a request 410 to modify the data stored in uncompressed blocks 515 is equal to the maximum compression group size (assuming a maximum compression group size of eight). At step 805, when the number of data blocks is greater than or equal to the maximum compression group size, the process proceeds to step 820 as described below. Otherwise, when the number of data blocks is less than the maximum compression group size, the process proceeds to step 810.

At step 810, the process sets the number of estimated blocks (EB) to equal the number of data blocks required to store the uncompressed data. Then the process proceeds to step 815 where the number of estimated blocks is returned to the calling process (e.g., process 700, 900, 1000). It is noted that this approach assumes that compression will not substantially reduce the data associated with a request 410 when the number of data blocks is less than the maximum compression group size. However, in other embodiments (not shown), the process 800 does not include this assumption. Instead, the process 800 determines the whether the compressed data satisfies a compression threshold irrespective of the compression group size. That is, in other embodiments, the process 800 begins at step 820.

At step 820, the process compresses the data blocks. Then the process proceeds to step 825. At step 825, the process determines whether the number of compressed data blocks satisfies a particular threshold level of savings. Such a threshold may indicate, for example, a particular reduction in the amount (e.g., number of blocks) of storage space consumed that must be achieved to merit the use of compression. In some embodiments, for example, a threshold is satisfied if the compressed data frees at least two of the eight blocks in a compression group. However, in other embodiments, other thresholds may be utilized.

In cases where the threshold is not satisfied, the process proceeds to step 810 where the process sets the number of estimated blocks equal to the number of data blocks required to store the uncompressed data. Then the process proceeds to step 815 where the number of estimated blocks is returned to the calling process (e.g., process 700, 900, 1000).

Otherwise, if the threshold is satisfied, the process proceeds to step 830. At step 830, the process sets the number of estimated blocks equal to the number of data blocks required to store the compressed data. Then, the process proceeds to step 815 where the number of estimated blocks is returned to the calling process (e.g., process 700, 900, 1000).

Figure 9:
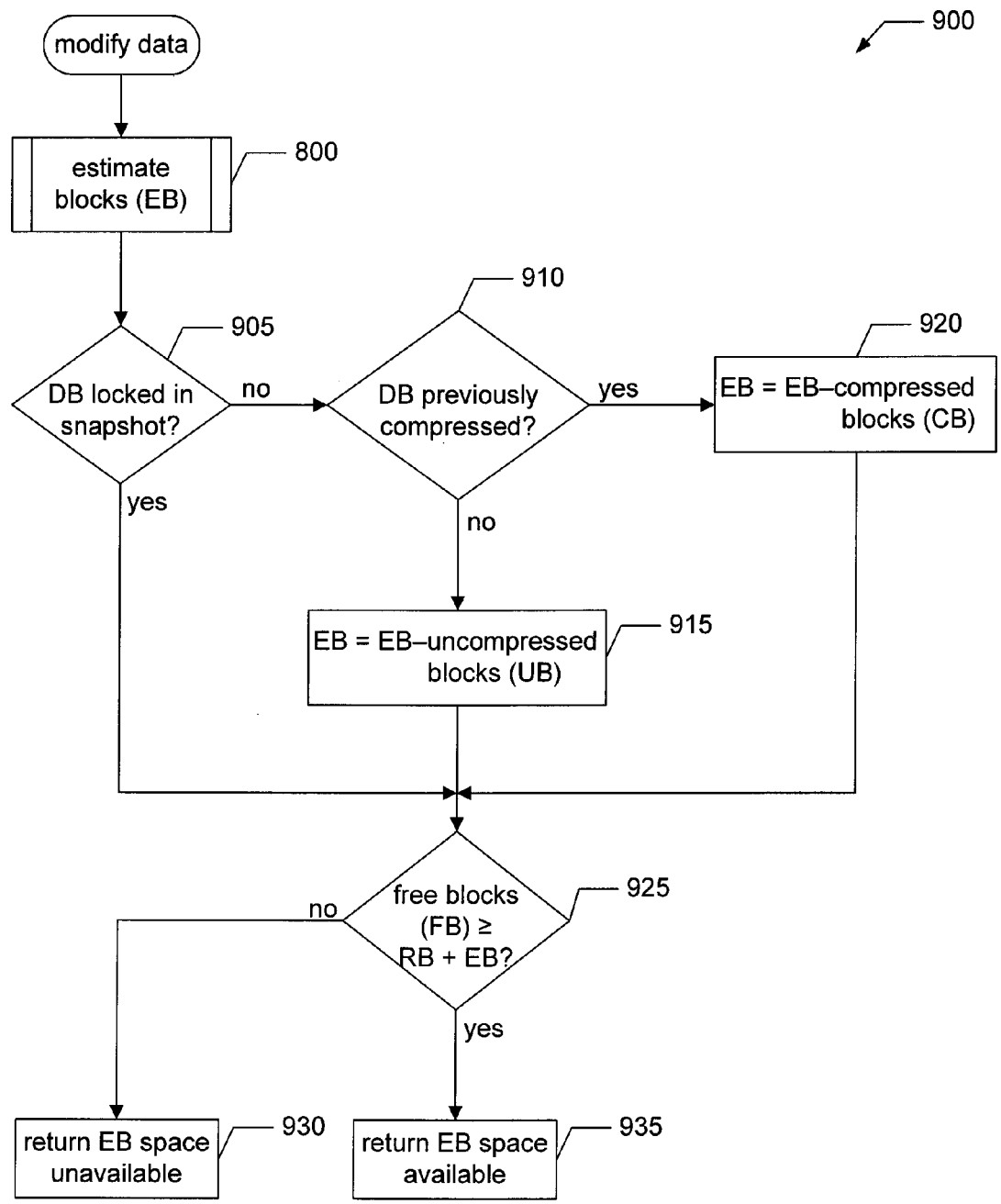
FIG. 9 is a flow chart of a process for estimating space in a compression enabled volume in response to a request to modify data.

FIG. 9 is a flow chart of a process 900 for estimating space in a compression enabled volume in response to a request to modify data. As described herein, this process may be invoked, for example, by process 600. In some embodiments, the process 900 is implemented by the reservation component 405.

Initially, the process 900 calls an estimate blocks process 800 to estimate the space consumed should the modified data be written to disk. The estimate blocks process 800 is discussed above in connection with FIG. 8.

Next, at step 905, the process determines whether the data is included in a snapshot stored on disk. As described herein, in some embodiments, the storage subsystem 110 includes one or more snapshots. A snapshot is a read-only, persistent point-in-time representation (e.g., image) of all of the data stored on one or more storage devices 120 (e.g., on disk or in other persistent memory), or a specified subset of such data. When data is included in one or more snapshots, the estimated space associated with overwriting the data is greater than the estimated space if a snapshot were not included. This is because the data is essentially locked in the snapshot (i.e., will not be deallocated when the modified data is written to disk).

If the data is included in a snapshot, then the process proceeds to step 925 as described below. Otherwise, if the data is not included in a snapshot, the process proceeds to step 910.

At step 910, the process determines whether the data blocks to be modified are compressed on disk. For example, the process may determine whether the data blocks are compressed by sequentially reading the VBNs of the compression group associated with the data blocks. If at least one of the VBNs of the compression group corresponds to a compression group descriptor (e.g., 520, 525), then the data blocks are compressed on disk. As described above, a compression group descriptor signifies that the data for the adjacent blocks is compressed into a lesser number of physical data blocks.

If the data blocks to be modified are compressed, the process proceeds to step 920 as described below. Otherwise, if the data blocks to be modified are uncompressed, the process proceeds to step 915. At step 915, the process subtracts the number of uncompressed data blocks stored on disk from the number of estimated blocks (e.g., returned by process 800). Then the process proceeds to step 925 as described below. For example, in FIG. 5A, the storage manager may receive a request 410 to modify data stored in the uncompressed data blocks 515. To facilitate description, it is assumed that the uncompressed data blocks 515 are not included in a snapshot. Further, to facilitate description, it is assumed that the modified data blocks (not shown) can be compressed to six data blocks. Then, in the current example, the estimated number of blocks required to service the request 410 is negative two.

At step 920, the process subtracts the number of compressed data blocks stored on disk from the number of estimated blocks (e.g., returned by process 800). Then the process proceeds to step 925. For example, the storage manager may receive a subsequent request to modify compressed data blocks 540. Again, to facilitate description, it is assumed that the compressed data blocks 540 are not included in a snapshot, and that the modified data blocks can be compressed to six data blocks. Then, in this example, the estimated number of blocks required to service the subsequent request is zero.

Returning to FIG. 9, at step 925, the process determines whether the number of free blocks is greater than or equal to the combined number of estimated blocks and reserved blocks. If the number of free blocks is less than the combined number of estimated blocks and reserved blocks, then the process proceeds to step 930 where a message is returned to the calling process (e.g., process 600) indicating that the storage space is unavailable. Otherwise, if the number of free blocks is greater than or equal to than the combined number of estimated blocks and reserved blocks, then the process proceeds to step 920 where a message is returned to the calling process (e.g., process 600) indicating that the storage space is available.

Figure 10:
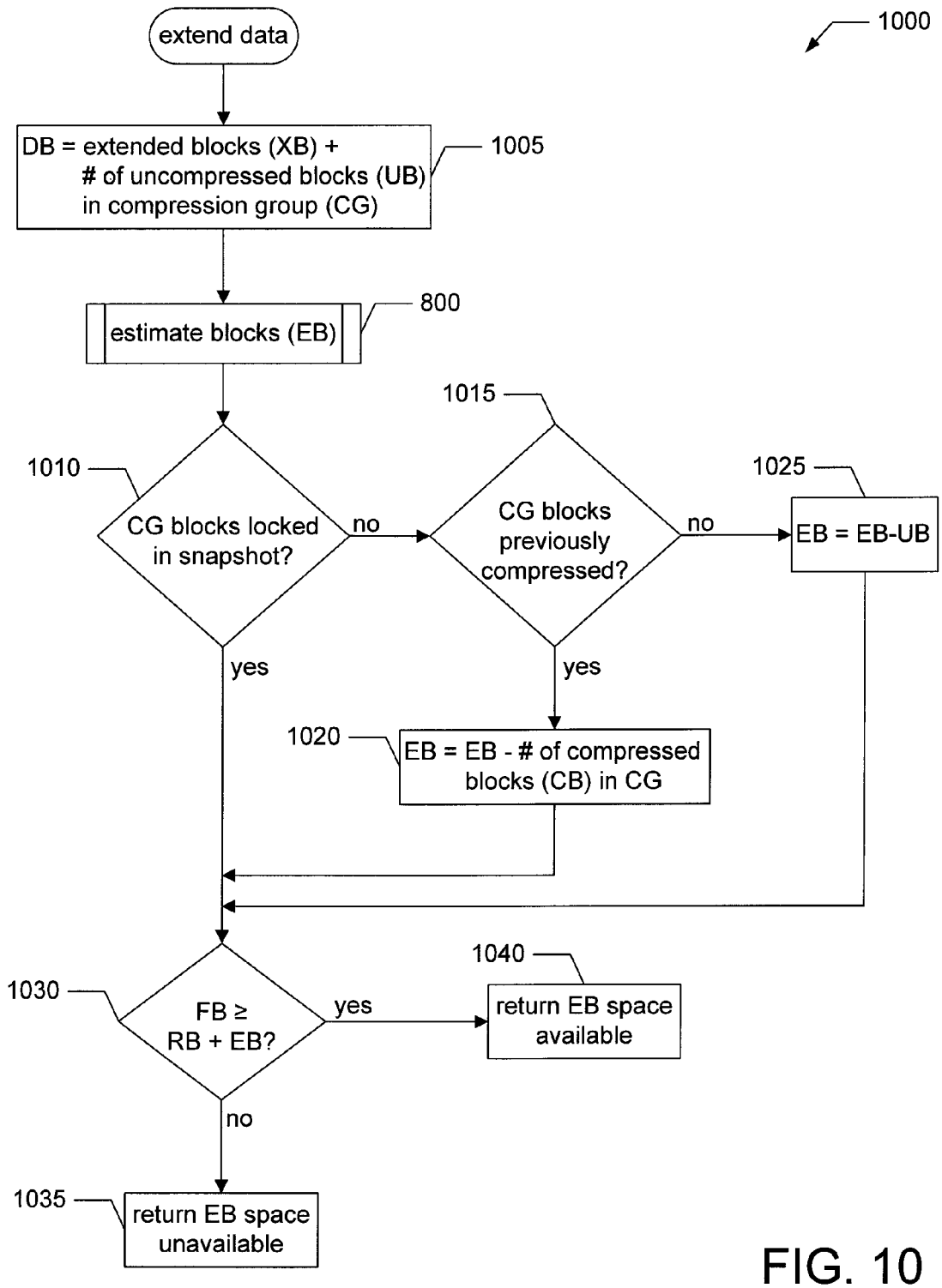
FIG. 10 is a flow chart of a process for estimating space in a compression enabled volume in response to a request to extend data.

FIG. 10 is a flow chart of a process 1000 for estimating space in a compression enabled volume in response to a request to extend data. As described herein, this process may be invoked, for example, by process 600. In some embodiments, the process 1000 is implemented by the reservation component 405.

Initially, at step 1005, the process sets the number of data blocks to equal the number of extended data blocks plus the number of uncompressed data blocks in the compression group corresponding to the extended data blocks. The process then proceeds to call an estimate blocks process 800 to estimate the space consumed should the data be extended. The estimate blocks process 800 is discussed above in connection with FIG. 8.

Next, at step 1010, the process determines whether the data to be extended is included in a snapshot stored on disk. If the data is included in a snapshot, then the process proceeds to step 1030 as discussed below. Otherwise, if the data is not included in a snapshot, the process proceeds to step 1015.

At step 1015, the process determines whether the data blocks to be extended are compressed on disk. If the data blocks to be extended are uncompressed, the process proceeds to step 1025 as described below. Otherwise, if the data blocks to be extended are compressed, the process proceeds to step 1020. At step 1020, the process subtracts the number of compressed data blocks from the number of estimated blocks (e.g., returned by process 800). Then the process proceeds to step 1030 as described below.

At step 1025, the process subtracts the number of uncompressed data blocks from the number of estimated blocks (e.g., returned by process 800). Then the process proceeds to step 1030.

At step 1030, the process determines whether the number of free blocks is greater than or equal to the combined number of estimated blocks and reserved blocks. If the number of free blocks is less than the combined number of estimated blocks and reserved blocks, then the process proceeds to step 1035 where a message is returned to the calling process (e.g., process 600) indicating that the storage space is unavailable. Otherwise, if the number of free blocks is greater than or equal to the combined number of estimated blocks and reserved blocks, then the process proceeds to step 1040 where a message is returned to the calling process (e.g., process 600) indicating that the storage space is available.

Thus, a system and method for estimating space to facilitate storage on a compression enabled volume has been described. Note that references in this specification to "an embodiment", "one embodiment", "some embodiments", or the like, mean that the particular feature, structure or characteristic being described is included in at least one embodiment of the present invention. Occurrences of such phrases in this specification do not necessarily all refer to the same embodiment. Although the technology introduced herein has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A storage server comprising:
a processor;
a network communication interface to provide the storage server with data communication with a plurality of clients over a network;
a storage interface to provide the storage server with data communication with a set of mass storage devices, wherein at least one of the mass storage devices is compression enabled; and
a memory containing code which, when executed by the processor, causes the storage server to execute a process to estimate space in the set of mass storage devices, the process including,
receiving a request over the network from a client to store a set of data, wherein an amount of free storage space in the mass storage devices is less than a sum of an amount of storage space required to store the set of data without compression and a reserved amount of storage space, the reserved amount of storage space including an amount of storage space unavailable for storage but not yet allocated in the mass storage devices;
estimating an amount of storage space to store the set of data compressed in the mass storage devices;
comparing the sum of the estimated amount of storage space and the reserved amount of storage space to the amount of free storage space in the mass storage devices; and
in response to said comparing resulting in a determination that the amount of free storage space is greater than or equal to the sum of the estimated amount of storage space and the reserved amount of storage space and before allocating space in the mass storage devices to store the set of data, sending a response over the network to the client, the response indicating that the request to store the set of data succeeded.

2. The storage server of claim 1 wherein estimating space in the set of mass storage devices is performed by a file system layer of the storage server.

3. The storage server of claim 1 wherein estimating the amount of space further includes:
defining at least one compression group corresponding to the set of data, wherein the set of data has a first number of subsets and the compression group includes a plurality of pointers, each pointer identifying a corresponding one of the first subsets;

compressing the set of data so that the set of data occupies a smaller number of the subsets than the first number.

4. The storage server of claim 3 further comprising determining whether the smaller number of the subsets satisfies a compression threshold; and when the smaller number does not satisfy the compression threshold, setting the estimated amount of space equal to the first number; and when the smaller number satisfies the compression threshold, setting the estimated amount of space equal to the smaller number.

5. The storage server of claim 3 wherein the set of data corresponds to a portion of a Logical Unit Number (LUN), and each of the subsets of the set of data is a separate block within the portion of the LUN.

6. The storage server of claim 3 wherein the set of data corresponds to a portion of a file, and each of the subsets of the set of data is a separate block within the portion of the file.

7. The storage server of claim 6 wherein the at least one compression group is a portion of an indirect block of the file.

8. The storage server of claim 6 wherein the at least one compression group is a portion of an inode of the file.

9. The storage server of claim 1 wherein the process further comprises storing the set of data on at least one of the mass storage devices.

10. A method comprising:
receiving over a network from a computing system a request to store data, the data to be stored in a compression enabled storage device, wherein the data without compression is represented as a first number of data blocks, and wherein a number of free data blocks in the storage device is less than a sum of the first number of data blocks and a number of reserved data blocks, the reserved data blocks unavailable for storage but not yet allocated in the storage device;

estimating a second number of data blocks required to store the data compressed in the storage device;

comparing the sum of the second number of data blocks and the number of reserved data blocks to the number of free data blocks in the storage device; and in response to said comparing resulting in a determination that the number of free data blocks is greater than or equal to the sum of the second number of data blocks and the number of reserved data blocks and prior to allocating space in the storage device for the data, sending a response over the network to the computing system, the response indicating that the request to store the data succeeded.

11. The method of claim 10 wherein estimating the second number of data blocks further comprises defining at least one compression group corresponding to the first number of data blocks, wherein the compression group includes a plurality of pointers, each pointer identifying a corresponding one of the first data blocks; and compressing the data so that the first number of data blocks occupy a smaller number of data blocks than the first number, and wherein the smaller number of data blocks is equal to the second number of data blocks.

12. The method of claim 11 wherein the first number of data blocks corresponds to a portion of a file, and each of the first data blocks is a separate block within the portion of the file.

13. The method of claim 12 wherein the at least one compression group is a portion of an indirect block of the file.

14. The method of claim 12 wherein the at least one compression group is a portion of an inode of the file.

15. The method of claim 10 wherein the method is performed by a storage server.

16. The method of claim 10 wherein first number of data blocks is equal to the second number of data blocks.

17. The method of claim 10 further comprising storing the data in the storage device.

18. A method comprising: receiving over a network at a storage server a request from a storage client to write data, the data being for storage in a compression enabled storage device associated with the storage server, wherein an amount of free space in the storage device is less than a sum of an amount of storage space required to write the data without compression and a reserved amount of storage space, the reserved amount of storage space including an amount of storage space unavailable for storage but not yet allocated in the storage device; and prior to space for the data being allocated in the storage device in connection with the request, and without compressing the data in the storage device, computing an estimate of an amount of space needed to store the data compressed in the storage device, comparing the sum of the estimated amount of storage space and the reserved amount of storage space to the amount of free storage space in the storage device, and in response to said comparing resulting in the amount of free space in the storage device being equal to or greater than the sum of the estimate and the reserved amount of storage space, sending over the network to the storage client a response to the request indicating a successful write.

19. The method of claim 18 wherein the method is performed by a file system layer of the storage server.

20. The method of claim 18 wherein the data is represented as a number of blocks; and wherein the method further comprises:

defining at least one compression group corresponding to the data, wherein the compression group includes a plurality of pointers, each pointer referencing a corresponding one of the data blocks; and compressing the data so that the data occupies a smaller number of blocks.

21. The method of claim 20 further comprising determining whether the smaller number of blocks satisfies a pre-defined threshold; and when the smaller number of blocks does not satisfy the pre-defined threshold, computing the estimate of the amount of space needed to store the data to be equal to the number of blocks; and when the smaller number of blocks does satisfy the pre-defined threshold, computing the estimate of the amount of space needed to store the data to be equal to the smaller number of blocks.

22. The method of claim 18 further comprising storing the data in the storage device.

23. The method of claim 22 wherein the data is stored in the storage device during an event called a consistency point.

24. The method of claim 18 wherein the method is performed prior to a consistency point event.

25. A storage server comprising:
a processor;
a network communication interface to provide the storage server with data communication with a plurality of clients over a network;

a storage interface to provide the storage server with data communication with a set of mass storage devices, wherein at least one of the mass storage devices is compression enabled; and a memory containing code which, when executed by the processor, causes the storage server to execute a process to estimate space in the set of mass storage devices, the process including, receiving a request over the network from a client to store a set of data, wherein the request is associated with data already stored in the mass storage devices, further wherein a sum of i) an amount of free storage space in the mass storage devices and ii) an amount of storage space allocated to said already-stored data is less than a sum of i) an amount of storage space required to store the set of data without compression and ii) a reserved amount of storage space, the reserved amount of storage space unavailable for storage but not yet allocated in the mass storage devices;

determining the amount of storage space allocated to said already-stored data;

estimating an amount of storage space to store the set of data compressed in the mass storage devices;

comparing the sum of i) the amount of free storage space in the mass storage devices and ii) the amount of storage space allocated to said already-stored data to the sum of i) the estimated amount of storage space and ii) the reserved amount of storage space;

in response to said comparing resulting in a determination that the sum of i) the amount of free storage space in the mass storage devices and ii) the amount of storage space allocated to said already-stored data is greater than or equal to the sum of i) the estimated amount of storage space and ii) the reserved amount of storage space, and before allocating space in the mass storage devices to store the set of data, sending a response over the network to the client, the response indicating that the request to store the set of data succeeded.

26. The storage server of claim 25 wherein said already-stored data is compressed.

27. The storage server of claim 25 wherein said already-stored data is uncompressed.

28. The storage server of claim 25 wherein estimating space in the set of mass storage devices is performed by a file system layer of the storage server.

29. The storage server of claim 25 wherein estimating the amount of space further includes:

defining at least one compression group corresponding to the set of data, wherein the set of data has a first number of subsets and the compression group includes a plurality of pointers, each pointer identifying a corresponding one of the first subsets;

compressing the set of data so that the set of data occupies a smaller number of the subsets than the first number.

30. The storage server of claim 29 further comprising determining whether the smaller number of the subsets satisfies a compression threshold; and when the smaller number does not satisfy the compression threshold, setting the estimated amount of space equal to the first number; and when the smaller number satisfies the compression threshold, setting the estimated amount of space equal to the smaller number.

31. The storage server of claim 29 wherein the set of data corresponds to a portion of a Logical Unit Number (LUN), and each of the subsets of the set of data is a separate block within the portion of the LUN.

32. The storage server of claim 29 wherein the set of data corresponds to a portion of a file, and each of the subsets of the set of data is a separate block within the portion of the file.

33. The storage server of claim 32 wherein the at least one compression group is a portion of an indirect block of the file.

34. The storage server of claim 32 wherein the at least one compression group is a portion of an inode of the file.

35. The storage server of claim 25 wherein the process further comprises storing the set of data on at least one of the mass storage devices.

* * * * *

UNITED STATES PATENT AND TRADEMARK OFFICE
CERTIFICATE OF CORRECTION

PATENT NO. : 8,539,191 B2
APPLICATION NO. : 12/349423
DATED : September 17, 2013
INVENTOR(S) : Dnyaneshwar Pawar et al.

Page 1 of 1

It is certified that error appears in the above-identified patent and that said Letters Patent is hereby corrected as shown below:

In the Specifications

In column 6, line 11, after "Channel" insert -- Protocol --.

In the Claims

In column 18, line 18, in claim 18, delete "vet" and insert -- yet --, therefor.

Signed and Sealed this
First Day of April, 2014

Michelle K. Lee
*Deputy Director of the United States Patent and Trademark Office*